(12) United States Patent
Dobmeier et al.

(10) Patent No.: US 12,397,653 B2
(45) Date of Patent: Aug. 26, 2025

(54) OPERATING AN ON-BOARD POWER SUPPLY OF AN ELECTRICALLY DRIVABLE MOTOR VEHICLE

(71) Applicants: AUDI AG, Ingolstadt (DE); VOLKSWAGEN AKTIENGESELLSCHAFT, Wolfsburg (DE)

(72) Inventors: Georg Dobmeier, Kösching (DE); Tobias Grassl, Denkendorf (DE); Kai Marschall, Braunschweig (DE); Cornelius Rettner, Lauf an der Pegnitz (DE); Bjarne Wirsen, Aachen (DE)

(73) Assignees: AUDI AG, Ingolstadt (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 18/533,505

(22) Filed: Dec. 8, 2023

(65) Prior Publication Data

US 2024/0190258 A1    Jun. 13, 2024

(30) Foreign Application Priority Data

Dec. 8, 2022    (DE) ...................... 10 2022 132 622.5

(51) Int. Cl.
*B60L 15/00*    (2006.01)
*B60L 58/26*    (2019.01)
*B60L 53/16*    (2019.01)

(52) U.S. Cl.
CPC ............. *B60L 15/007* (2013.01); *B60L 58/26* (2019.02); *B60L 53/16* (2019.02); *B60L 2210/40* (2013.01)

(58) Field of Classification Search
None
See application file for complete search history.

(56) References Cited

U.S. PATENT DOCUMENTS

| | | | |
|---|---|---|---|
| 2020/0023746 A1* | 1/2020 | Kim | ................... B60L 53/14 |
| 2020/0122545 A1* | 4/2020 | Lee | ................. B60H 1/00921 |
| 2022/0337153 A1* | 10/2022 | Lee | ..................... H02M 1/10 |

FOREIGN PATENT DOCUMENTS

| | | |
|---|---|---|
| DE | 10 2017 008 840 A1 | 3/2018 |
| DE | 10 2017 011 857 A1 | 5/2018 |
| DE | 10 2021 001 285 A1 | 4/2021 |
| DE | 10 2020 207 513 A1 | 6/2021 |
| DE | 10 2021 003 180 A1 | 8/2021 |

OTHER PUBLICATIONS

German Examination Report issued in German Application No. 10 2022 132 622.5 dated Jul. 7, 2023.

* cited by examiner

*Primary Examiner* — Jared Fureman
*Assistant Examiner* — Aqeel H Bukhari
(74) *Attorney, Agent, or Firm* — STAAS & HALSEY LLP

(57) ABSTRACT

The described examples may relate to a method of operating an on-board power supply of an electrically drivable motor vehicle, in which at least one electrical machine is supplied with electrical energy from a vehicle battery connected to the on-board power supply via an inverter connected to the on-board power supply in an intended drive operation, and the inverter may include a radio interference suppression filter to reduce grid-bound interferences. In an example, at least the inverter may be electrically disconnected from the on-board power supply in a charging operation.

10 Claims, 3 Drawing Sheets

OPERATING AN ON-BOARD POWER SUPPLY OF AN ELECTRICALLY DRIVABLE MOTOR VEHICLE

CROSS-REFERENCE TO RELATED APPLICATIONS

This application claims the benefit of German Application No. 10 2022 132 622.5 filed on Dec. 8, 2022, in the German Intellectual Property Office, the disclosure of which is incorporated herein by reference in its entirety.

BACKGROUND

1. Field

The present disclosure of examples of an invention may relate to a method for operating an on-board power supply of an electrically drivable motor vehicle, in which at least one electrical machine is supplied with electrical energy from a vehicle battery connected to the on-board power supply via an inverter connected to the on-board power supply in an intended drive operation, wherein the inverter comprises a radio interference suppression filter for reducing grid-bound interferences. Furthermore, the present disclosure may relate to an on-board power supply for an electrically drivable motor vehicle, wherein the on-board power supply may include at least a first electrical connection for connecting to a vehicle battery of the motor vehicle, a second electrical connection for connecting to an inverter, which is electrically connected to at least one electrical machine for driving the motor vehicle in an intended drive operation and which comprises a radio interference suppression filter for reducing grid-bound interferences, as well as a charging connection for electrically coupling the on-board power supply to a charging station external to vehicle in a charging operation. Finally, the present disclosure may also relate to a motor vehicle with at least one electrical machine for driving the motor vehicle in an intended drive operation, an on-board power supply for distributing electrical energy between electrical devices of the motor vehicle, an inverter connected to the on-board power supply and the electrical machine for electrically coupling the electrical machine to the on-board power supply, wherein the inverter may include a radio interference suppression filter for reducing grid-bound interferences, a vehicle battery connected to the on-board power supply for providing electrical energy, and a charging connection connected to the on-board power supply for electrically coupling the on-board power supply to a charging station external to vehicle in a charging operation.

2. Description of Related Art

Generic methods, on-board power supplies and motor vehicles may be extensively known in the prior art such that a separate printed evidence is fundamentally not required hereto. An electrically drivable motor vehicle usually comprises at least one electrical machine, which serves for driving the motor vehicle during the intended drive operation. According to need, however, two or more electrical machines can also be provided here. The electrical machine is usually formed as a rotating electrical machine and can for example be formed by a single- or multi-phase electrical AC voltage machine, for example a synchronous machine, an asynchronous machine or the like. Often, such AC voltage machines are formed as three-phase electrical AC voltage machines. However, there is fundamentally also the possibility of using a DC voltage machine, wherein the inverter then only has to be formed or be operated as a DC/DC converter.

For a reliable operation of the on-board power supply, it is required that the electrical devices connected to the on-board power supply can be reliably operated with respect to the electromagnetic compatibility, in particular with respect to grid-bound interferences. For this purpose, at least the inverter comprises a radio interference suppression filter on the side of the on-board power supply. According to need, a corresponding radio interference suppression filter can also be provided for at least one of the electrical devices.

Electrical devices, which can be connected to the on-board power supply in addition to the inverter and the vehicle battery, are e.g. an electrical air conditioner, heating devices and/or the like.

Usually, the on-board power supply is a DC voltage on-board power supply, which is supplied with high voltage. Presently, high voltage means an electrical DC voltage, which is larger than about 60 V. The high voltage may correspond to the standard ECE R 100.

Particularly during the intended drive operation, the operation of the inverter causes retroactions on the side of the on-board power supply, which relate to the electromagnetic compatibility. Here, it is in particular to be mentioned that the on-board power supply is charged with grid-bound interferences by the operation of the inverter. Grid-bound interferences occur both as differential mode interferences between electrical potentials of the on-board power supply and as common mode interferences with respect to a reference potential of the motor vehicle, in particular a motor vehicle ground. Usually, these different interferences are attenuated by the radio interference suppression filter with respectively adapted filter measures to an admissible extent, such that the reliable operation of the on-board power supply with the electrical devices connected thereto can be ensured. Therein, it proves to be advantageous especially with respect to common mode interferences on the filter side if corresponding Y-capacitors can be employed.

A Y-capacitor is in particular an electrical capacitor specially formed for the function of the radio interference suppression, which has to comply with particular technical requirements, in particular with respect to its withstand voltage, its current rating and/or the like. These capacitors are electronic components, which have to comply with particular requirements, in particular with respect to the radio interference suppression, as it is for example given by standards relating to the electromagnetic compatibility like EN 61000 or also with respect to the electrical safety. Y-capacitors are usually registered by the standardization, for example according to IEC 60364. They are capacitors, which are usually connected between a phase conductor or a neutral conductor connection and a reference potential or, in case of DC voltage, between a respective electrical potential of the DC voltage and the reference potential, for example a touchable, in particular protectively grounded part, whereby they can bridge a basic insulation usually required due to the electrical safety. Therefore, they have to comply with particularly high, in particular standardized, requirements. Y-capacitors are often employed for suppressing common mode interferences. Incidentally, this is a particular constellation, in which the reference potential, as it can for example be provided by the protective conductor, is allowed to be used for purposes other than for protective ground and thereby for the protection from electric strike. The X-capacitors also employed for the purpose of radio interference suppression of grid-bound radio interferences, which are usually employed for suppressing differential mode interferences between the electrical potentials, differ therefrom. In order not to compromise the protective function of the reference potential or of the protective conductor, increased protective demands are made both to X-capacitors and Y-capacitors.

The employment of Y-capacitors can entail leakage currents. This too is registered by the standardization. In many electrical applications, the leakage current is essentially determined by the filter circuit, which serves for complying with the electromagnetic compatibility, in particular with respect to grid-bound radio interferences. In particular for suppressing such grid-bound radio interferences, Y-capacitors are often employed in the filter circuit, which electrically couple a respective potential to be interference-suppressed to the reference potential. This results in the fact that upon application of an AC voltage, a corresponding alternating current also flows through the Y-capacitor, which at least partially determines the leakage current. Moreover, the leakage current can also be dependent on further, in particular capacitive, couplings.

Y-capacitors are connected to the DC voltage intermediate circuit of the inverter for grid-bound interference suppression, which electrically couple each of the at least two electrical potentials, which correspond to the intermediate circuit potentials at the same time, to the motor vehicle side reference potential or the motor vehicle ground. Hereby, a grid-bound radio interference suppression can be achieved or improved. Since the motor vehicle is substantially not electrically coupled to the charging station and thus to the reference potential of the charging station, in particular the ground potential, in the intended drive operation, and particular requirements with respect to the leakage current in the isolated operation of the on-board power supply of the motor vehicle are more liberal than in stationary electrical devices, the Y-capacitors usually have a comparatively large capacitance value. However, since an intermediate circuit DC voltage of the DC voltage intermediate circuit of the inverter is subject to relatively small voltage fluctuations in the intended operation as a DC voltage, the leakage current is correspondingly low despite of the large capacitance value. A usual capacitance of such Y-capacitors is for example about 500 nF. For an overall system, which includes a motor vehicle connected to a charging station, a maximum value of the capacitance provided by Y-capacitors is often preset by standardization and/or legal regulation. In the drive operation, that is if the motor vehicle is in particular not connected to the charging station, the capacitance provided by the Y-capacitors can be larger. Therefore, a capacitance value preset for the overall system is for example allowed to be available in the drive operation on the motor vehicle side. This restriction is in particular effected for the protection from electric strike.

Y-capacitors may be selected as large as possible with respect to their capacitance value. In context of a current-compensated inductor, via which the on-board power supply can be connected, a good suppression of common mode interferences can be achieved with adequate effort. Nevertheless, the maximum value of the electrical capacitance of the Y-capacitors is limited. On the one hand, this results for reasons of the electrical safety, in particular during a charging operation, in which the motor vehicle is outside of the drive operation and in which it is connected to a charging station in order that the vehicle battery can be charged. For safety reasons among other things, the standardization limits the maximum capacitance. In this context, the standard SAE J1772/2017 is to be mentioned among other things, which specifies a value dependent on voltage for a maximum electrical energy stored in the Y-capacitors depending on an electrical voltage, which in particular results from a sum of the capacitances of the motor vehicle and of the charging station. Moreover, the standard IEC 61851/23 is to be mentioned, which specifies a maximum value for a Y-capacitor of about 500 nF for the charging station. In determining the value of the Y-capacitors, it further has to be considered that the values preset by the standardization additionally also register parasitic capacitances.

In this context, DE 10 2021 003 180 A1 discloses an electrical on-board power supply for an electrically operable vehicle and a method for operating an electrical on-board power supply. In particular, in order to improve the situation in the charging operation, DE 10 2021 003 180 A1 proposes to switch off a portion of the Y-capacitors during the charging operation. Moreover, DE 10 2021 001 285 A1 discloses an electrical on-board power supply for a motor vehicle and a method for operating the electrical on-board power supply. According to this teaching, Y-capacitors are commonly disconnected from the electrical reference potential. Finally, DE 10 2020 207 513 A1 discloses a method for protecting from high contact voltages by a vehicle high-voltage power supply.

Even if the prior art has proven itself, disadvantages nevertheless remain. Namely, the prior art does not take into account that parasitic Y-capacitances can occur in the motor vehicle, which can entail non-insignificant hazard potential.

SUMMARY

The described examples may improve a method, an on-board power supply as well as a motor vehicle with respect to the electrical safety.

The described examples may be a method, an on-board power supply as well as a motor vehicle according to the independent claims.

Advantageous developments can be derived from the features of the dependent claims.

With respect to a method, in an example, at least the inverter is electrically disconnected from the on-board power supply in a charging operation.

With respect to an on-board power supply, in an example the on-board power supply comprises a switching unit, which is formed to electrically disconnect at least the second electrical connection from the on-board power supply depending on a switching state of the switching unit in the charging operation.

With respect to a motor vehicle, an on-board power supply may be formed according to the described examples.

Among other things, the described examples may be based on the realization that not only the Y-capacitors of the radio interference suppression filter are relevant to the question of the electrical safety, but parasitic Y-capacitances can also be relevant especially in electrically drivable motor vehicles. In this context, the electrical machine is in particular to be mentioned, which can have a particularly considerable portion of the Y-capacitance in a motor vehicle due to its mechanical construction and electrical characteristics. In order to reduce this problem, it can therefore possibly not be sufficient to only switch off the Y-capacitors of a radio interference suppression filter, but extensive measures can be required. Therefore, in an example, the second electrical connection of the on-board power supply, to which the inverter is connected, can be electrically disconnected. Thereby, it is possible to not only deactivate the Y-capacitors of the radio interference suppression filter of the inverter or electrically disconnect them from the on-board power supply, but thereby, the electrical machine and the parasitic Y-capacitance thereof is additionally also disconnected from the on-board power supply at the same time. Thereby, this part of the Y-capacitance can be switched off in the charging operation, whereby the Y-capacitance of the vehicle considerably reduces and thus the preset maximum values are further complied with in combination with the charging station.

Inverters of the generic type as well as methods for the operation thereof are fundamentally known, such that a separate printed evidence is not required hereto. Inverters are a form of an electrical energy converter or energy transformer, by which electrical energy of a DC voltage can be converted into electrical energy of an AC voltage, in particular of a single-phase or also three-phase AC voltage. Nowadays, inverters are employed in the form of so-called static energy converters, this means that they do not comprise mechanically movable, in particular rotatable parts in contrast to dynamic energy converters. Inverters of the generic type as static energy converters are usually formed as clocked electronic energy converters and comprise at least one half-bridge module with two switching elements connected in series for this purpose, by which an electrical intermediate circuit DC voltage provided by a DC voltage intermediate circuit can be converted into an electrical AC voltage. Such an inverter may be configured for the so-called single-phase operation, that is the inverter provides a single electrical AC voltage. An advantageous configuration of such an inverter comprises two half-bridge modules connected in parallel, which are operated in opposite phase, whereby the level of the generated AC voltage can substantially be doubled. Such a circuit topology is also called full-bridge circuit. However, the inverter can also be configured for a multi-phase, in particular three-phase, operation. Hereto, additional half-bridge modules or full-bridge modules can for example be correspondingly provided. The inverter can also be formed as a multi-level energy converter.

A switching element in the sense of this disclosure is for example a controllable electronic switching element, for example a transistor, a thyristor, combination circuits hereof, in particular with free-wheeling diodes connected in parallel, for example a metal oxide semiconductor field effect transistor (MOSFET), an insulated gate bipolar transistor (IGBT), for example with integrated free-wheeling diodes, or the like.

The central connection of a half-bridge module may be a connection, at which the converted AC voltage is usually provided in the inverter operation.

The switching operation of the transistor means that a very low electrical resistance is provided in a switched-on state between the connections forming the switching path, such that a high current flow with very small residual voltage is possible. In the switched-off state, the switching path of the transistor is high ohmic, that is it provides a very high electrical resistance such that even with high voltage applied to the switching path, substantially no or only a very small in particular negligible current flow is present. A linear operation differs therefrom, but which is not employed in clocked energy converters.

Therefore, the described examples allow electrically disconnecting relevant electrical devices like the inverter from the on-board power supply, in particular if the on-board power supply is supplied with high voltage, such that the relevant effective Y-capacitance of the motor vehicle can be considerably reduced particularly during the charging operation. According to need, further electrical devices can also be further connected to the on-board power supply during the charging operation. For example, this is advantageous for a DC voltage converter or DC/DC converter, which serves for electrically coupling the on-board power supply to a low-voltage on-board power supply. Thereby, the low-voltage on-board power supply can also be supplied with electrical energy from the charging station during the charging operation.

The electrical disconnection may be formed as galvanic disconnection. The electrical disconnection can be realized by suitable switching elements. Hereto, the switching unit may comprises at least one electromechanical or electronic switching element. If a galvanic disconnection is desired, an electromechanical switching element in the manner of a relay, a contactor or the like may be provided. An electronic switching element can be formed as previously explained.

Moreover, the switching unit can comprise a corresponding switching element for realizing the desired switching function for the electrical connection of the at least one electrical device.

The electrical disconnection may be realized by the switching unit. Hereto, the switching unit can comprise corresponding switching elements. In an example, the switching unit can comprise at least two switching states, wherein at least the second electrical connection is electrically coupled to the on-board power supply in a first switching state, whereas at least the second electrical connection is electrically disconnected from the on-board power supply in a further switching state. Hereto, the switching unit can be correspondingly controlled by a control unit. The control unit can be a vehicle control unit. The control unit can ascertain if a drive operation or charging operation is present and transfer a corresponding switching signal to the switching unit. If the switching unit comprises the switching function for more than the second electrical connection, it can be provided that an own switching signal is provided by the control unit for each electrical connection.

In an example, the on-board power supply is supplied with high voltage. High voltage is suitable in particular for electrically drivable motor vehicles because a large power can be provided with a comparatively small electrical current for the intended drive operation. This has the advantage that line cross-sections of electrical lines of the on-board power supply can be kept low. This reduces installation space and weight, which is advantageous in particular in the vehicle area. The electrical voltage, which is usually a DC voltage, with which the on-board power supply is supplied, is for example about 400 V or 450 V. According to construction of the on-board power supply, it can for example also be about 800 V or 1200 V. Other, in particular even larger electrical voltages are also possible.

Moreover, in an example at least one electrical device connected to the on-board power supply comprises a radio interference suppression filter with Y-capacitors, wherein the Y-capacitors are deactivated in the charging operation. Thereby, the Y-capacitance of the motor vehicle can be reduced in the charging operation, such that the limit values are further complied with in combination with the charging station. However, this function does not have to be provided for all of the devices. It can be provided that this function is only realized for a further electrical device or some of the electrical devices of the motor vehicle.

In an example, the at least one electrical device is electrically disconnected from the on-board power supply. Thereby, it can be achieved—as also with the inverter—that parasitic Y-capacitances of the electrical device can also be deactivated besides the Y-capacitors. Thus, the function can be further improved.

Further, in an example, a cooling device connected to the on-board power supply for cooling the vehicle battery remains electrically connected to the on-board power supply during the charging operation. Thereby, it can be achieved that the cooling functionality can be performed as efficiently as possible and with a power as large as possible in the charging operation. This allows reducing a time for charging the vehicle battery.

Furthermore, in an example, electrical devices electrically disconnected from the on-board power supply during the charging operation are again electrically connected to the on-board power supply temporally spaced from each other after terminating the charging operation. This has the advantage that the electrically disconnected electrical devices do not act on the on-board power supply at the same time. Thereby, mutual interferences in establishing the electrical connection between the on-board power supply and the electrical devices can be reduced.

Furthermore, in an example, the temporally spaced electrical connection is effected depending on a power of the respective electrical device. Thus, it can be provided that a point of time since termination of the charging operation is for example determined depending on the power, at which the electrical connection to the respective electrical device is restored. For example, it can be provided that an electrical device with a large electrical power is again electrically connected to the on-board power supply in time before an electrical device with a small electrical power. Thereby, the reliability of the operation of the on-board power supply can be further improved.

For application cases or application situations, which can arise in the method and which are not explicitly described here, it can be provided that an error message and/or a request for input of a user feedback are output and/or a default setting and/or a determined initial state are adjusted according to the method.

The control device for the motor vehicle also belongs to the present disclosure. The control device can comprise a data processing device or a processor device, which is configured to perform the method according to the described examples. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured to perform the method according to the described examples upon execution by the processor device. The program code can be stored in a data memory of the processor device. A processor circuit of the processor device can comprise e.g. at least one circuit board and/or at least one SoC (System on Chip). By the control device, the on-board power supply, in particular the switching unit, can be controlled in the manner according to the described examples. The control device can be at least partially formed by a vehicle control.

Developments of the on-board power supply according to the described example, and the motor vehicle according to the described examples, which comprise features, as they have already been described in context of the developments of the method according to the described examples, also belong to the present disclosure. For this reason, the corresponding developments of the on-board power supply according to the described examples and the motor vehicle according to the described examples are not again described here.

The motor vehicle according to the described examples may be configured as a car, in particular as a passenger car or truck, or as a passenger bus or motorcycle.

The examples also include the combinations of the features of the described examples. Thus, the present disclosure also includes realizations, which each comprise a combination of the features of multiple of the described examples, if the examples have not been described as mutually exclusive.

BRIEF DESCRIPTION OF DRAWINGS

In the following, examples of the present disclosure are described. Hereto, there shows.

DESCRIPTION

Figure 1:
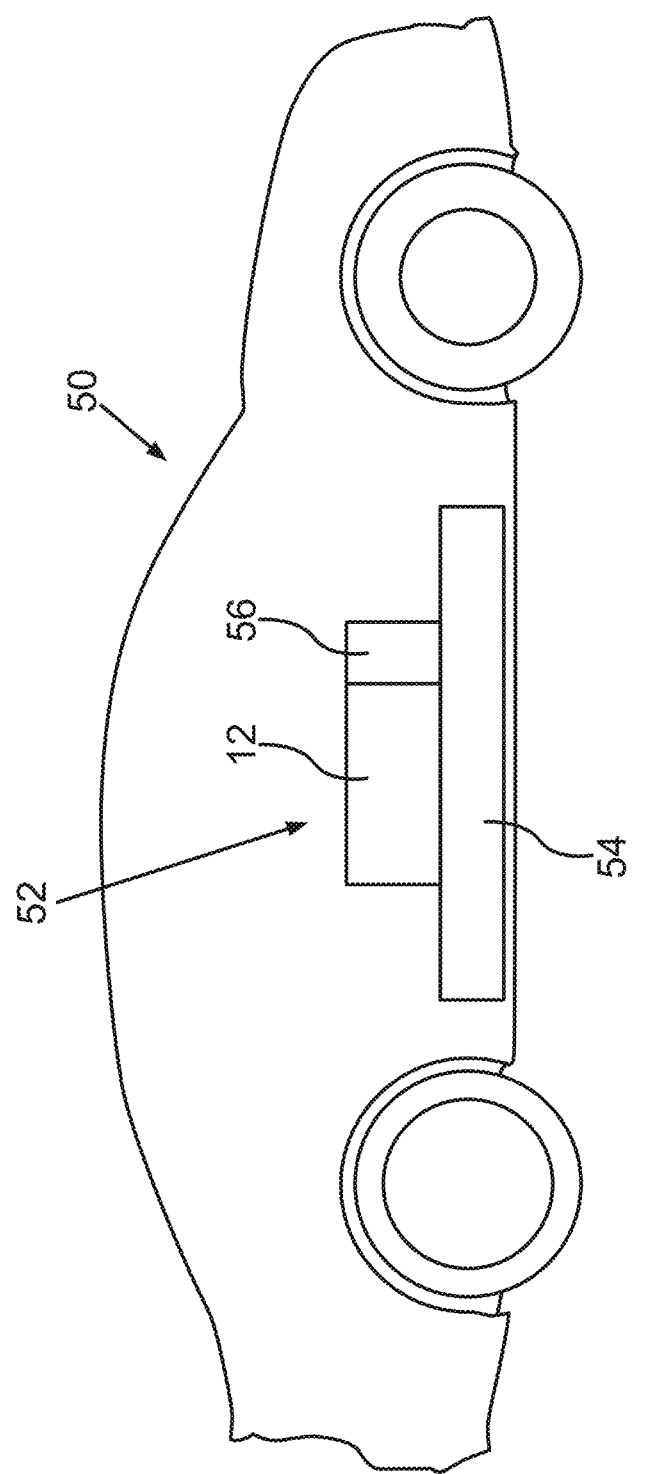
FIG. 1 in a schematic side view, an electrically drivable motor vehicle with an electrical drive device, which includes a synchronous machine.

The execution examples explained in the following are examples of the present disclosure. In the execution examples, the described components of the examples each represent individual features to be considered independently of each other, which also each develop the described examples independently of each other. Therefore, the disclosure also is to include combinations of the features of the examples different from the illustrated ones. Furthermore, the described examples can also be supplemented by further ones of the already described features of the examples.

In the figures, identical reference characters each denote functionally identical elements.

FIG. 1 shows an electrically drivable motor vehicle, which is here formed as an electric vehicle 50, in a schematic side view. The electric vehicle 50 comprises an electrical drive device 52, which includes a synchronous machine 12 for driving the electric vehicle 50 in an intended drive operation. The synchronous machine 12 is presently formed as a three-phase synchronous machine 12. Further, the electrical drive device 52 is connected to an on-board power supply 10 of the electric vehicle 50 via a three-phase inverter 56 as an energy converter, to which a high-voltage battery 54 as the vehicle battery is also connected, which serves for the electrical energy supply of the drive device 52 in an intended drive operation among other things.

Figure 2:
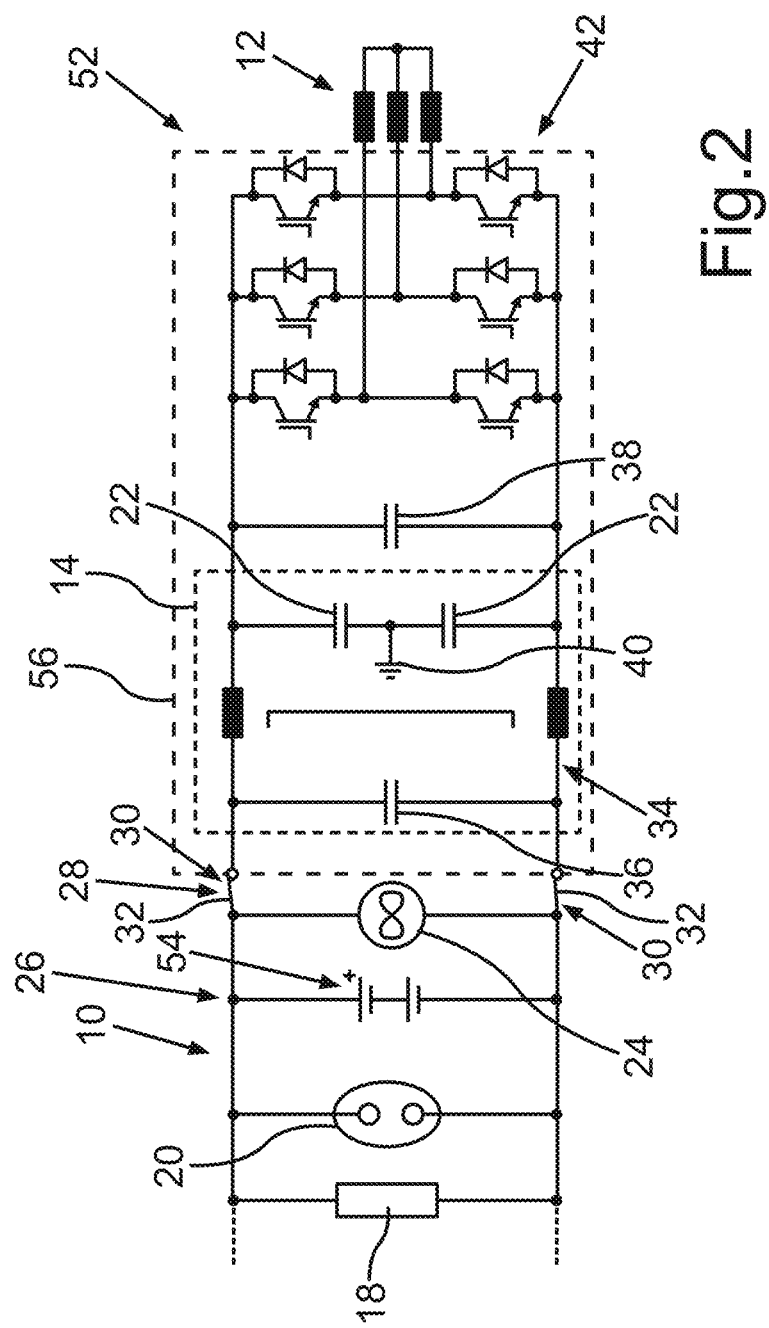
FIG. 2 in a schematic circuit diagram representation, a first configuration of a high-voltage on-board power supply of the motor vehicle according to FIG. 1 with a switching unit, which can switch off a connection of the on-board power supply electrically connected to an inverter.

FIG. 2 shows a first configuration of the on-board power supply 10 in a schematic circuit diagram representation. The on-board power supply 10 comprises a first electrical connection 26 for connecting to the vehicle battery 54 of the electric vehicle 50. Further, the on-board power supply 10 comprises a second electrical connection 28 for connecting to the inverter 56. The inverter 56 is electrically connected to the synchronous machine 12, which serves for driving the electric vehicle 50 in the intended drive operation. The inverter 56 comprises a radio interference suppression filter 14 for reducing grid-bound interferences. Furthermore, the on-board power supply 10 comprises a charging connection 20 for electrically coupling the on-board power supply 10 to a charging station external to vehicle in a charging operation. The charging station is not illustrated in the FIGS.

Further electrical devices 18 are further connected to the on-board power supply 10. Further, a cooling device 24 for cooling the vehicle battery 54 during the charging operation is connected to the on-board power supply 10. Moreover, further electrical devices can be connected to the on-board power supply.

Presently, the on-board power supply 10 is an on-board power supply, which is supplied with a high-voltage DC voltage. In the present configuration, it is provided that the DC voltage of the on-board power supply is about 450 Volts. In alternative configurations, this DC voltage can also have another value.

The charging connection 20 can be formed and arranged, respectively, as an electrical plug connector at the motor vehicle 50, for example in the area of a body shell or the like. The charging connection 20 serves for establishing a grid-bound detachable electrical connection to a charging station in the charging operation such that electrical energy can be supplied from the charging station to the vehicle battery 54. In the charging operation, the vehicle is outside of the intended drive operation.

It is further apparent from FIG. 2 that the inverter 56 comprises a radio interference suppression filter 14, via which the inverter 56 is electrically connected to the on-board power supply 10. The radio interference suppression filter 14 electrically couples the on-board power supply 10 to an intermediate circuit capacitor 38 of a DC voltage intermediate circuit of the inverter 56. Further, respective series connections from each two switching elements 42 of the inverter 56 are connected to the intermediate circuit capacitor 38 for each of the three phases. A stator winding of the synchronous machine 12 is connected to central connections of the series connections. In the present configuration, it is provided that the stator winding of the synchronous machine 12 is connected in a star connection.

Presently, the switching elements 42 are formed as IGBT. In alternative configurations, other suitable switching elements, for example MOSFET or the like, can of course also be provided here.

In the switching operation, the switching elements 42 are operated according to pulse width modulation (PWM), to supply the stator winding of the synchronous machine 12 with corresponding phase currents in preset manner. The function of the inverter 56 is fundamentally known to the expert, wherefore detailed explanations hereto are presently omitted.

The on-board power supply 10 comprises two electrical potentials or potential lines, namely HV+ and HV−, between which the DC voltage is applied. The radio interference suppression filter 14 comprises an X-capacitor 36 on the side of the on-board power supply, which serves for reducing in particular differential mode interferences, which occur during the intended operation of the inverter 56, in particular of its switching elements 42. A current-compensated inductor 34 is arranged between the X-capacitor 36 and the intermediate circuit capacitor 38. Further, a series connection of two Y-capacitors 22 is provided parallel to the intermediate circuit capacitor 38, the central connection of which is electrically connected to a vehicle ground 40 as a reference potential. This combination serves for attenuating common mode interferences among other things, which also occur during the intended operation of the inverter 56, in particular of the switching elements 42.

The inverter 56 connected to the second connection 28 of the on-board power supply 10 is formed electrically disconnectable in the present configuration. For this purpose, the on-board power supply 10 comprises a switching unit 30 with a contactor, which comprises two electromechanical switching contacts 32 as a two-pole contactor, by which the inverter 56 can be electrically disconnected from the electrical potentials of the on-board power supply 10, namely HV+ and HV−. Presently, the electrical disconnection is formed as a galvanic disconnection. Thereby, there is the possibility of disconnecting the Y-capacitors 22 from the on-board power supply 10 during a charging operation, in which the charging connection 20 is electrically connected to the charging station via a corresponding electrical line and electrical energy is supplied to the vehicle battery 54. Moreover, this configuration also allows disconnecting the electrical machine 12 from the on-board power supply 10 at the same time. Namely, a non-insignificant Y-capacitance can be provided via the electrical machine 12, which can relate to the electrical safety, in particular with respect to a contact voltage or the like. By this configuration, it is possible to ensure a reliable intended charging operation during the charging operation complying with the electrical requirements with respect to the electrical safety and to achieve a reliable and significant attenuation of grid-bound interferences due to the operation of the inverter 56 outside of the charging operation, that is during the intended drive operation at the same time.

The switching unit 30 allows this, the switching elements 32 of which are in the switched-off switching state in the charging operation. When the charging operation is terminated, the switching elements 32 of the switching unit 30 are again switched into the switched-on switching state, such that the drive operation can be resumed. Thereby, the function of the radio interference suppression filter 14 is also again fully available at the same time.

In an example, the operation of the inverter 56 may not be required during the charging operation. Thereby, it is possible to disconnect the inverter 56 from the on-board power supply 10 by the switching unit 30 such that the unfavorable characteristics with respect to the contact voltages and leakage currents occurring in particular by the inverter 56 and the radio interference suppression filter 14 thereof can be avoided.

Figure 3:
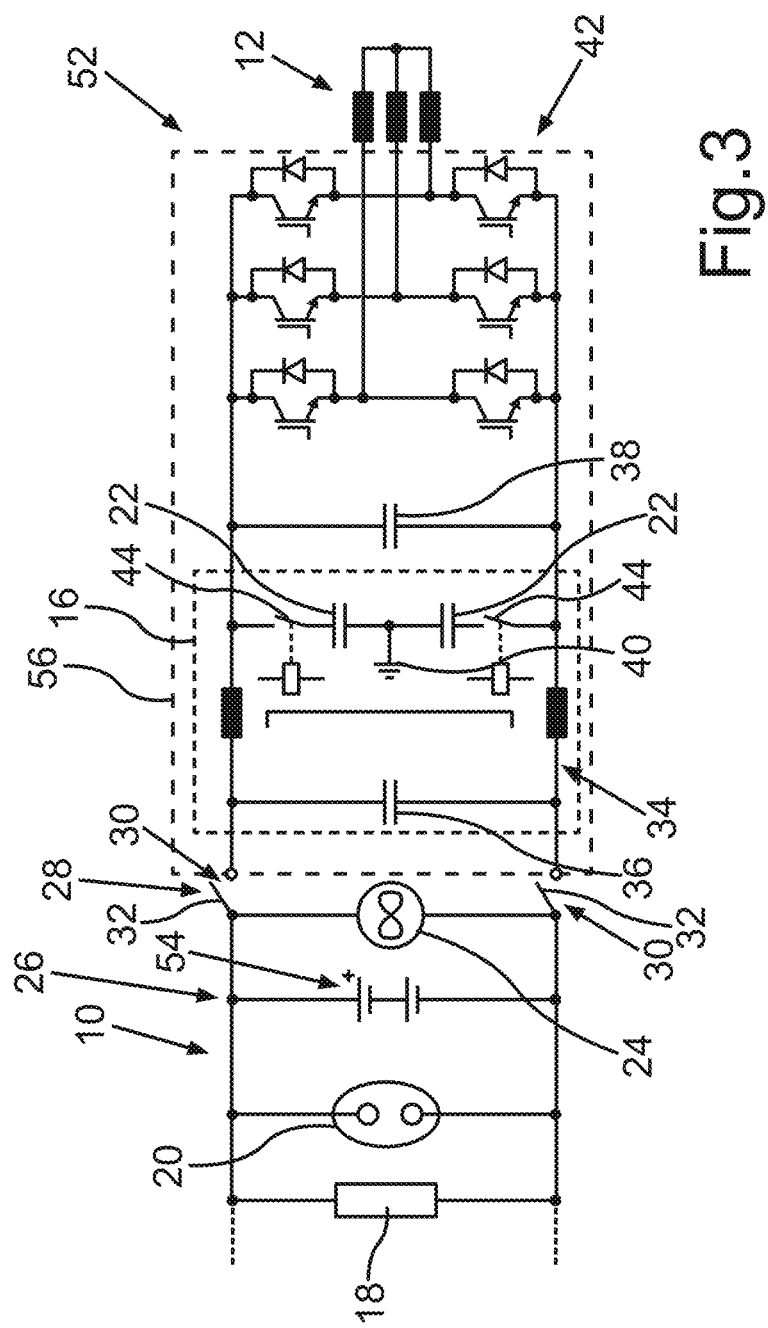
FIG. 3 in a schematic circuit diagram representation as FIG. 2, a second configuration of the high-voltage on-board power supply.

FIG. 3 shows a second configuration of the high-voltage on-board power supply 10 in a schematic circuit diagram representation as FIG. 2. The second configuration of the high-voltage on-board power supply 10 according to FIG. 3 is based on the first configuration according to FIG. 2, wherefore reference is additionally made to the relevant explanations above. In the following, only the differences are explained.

In contrast to the first configuration, in the configuration according to FIG. 3, a radio interference suppression filter 16 is provided. The radio interference suppression filter 16 differs from the radio interference suppression filter 14 according to FIG. 2 in that the Y-capacitors are not immediately connected to the current-compensated inductor 34, but via respective electromechanical contacts 44 of a respective relay operated by relays. The electromechanical contacts 44 can also be controlled by the non-illustrated control device.

The use of the electromechanical contacts 44 allows disconnecting the Y-capacitors 22 from the electrical potentials HV+ and HV− of the on-board power supply 10 independently of whether or not a charging operation is present. Thereby, additional safety can be achieved. Namely, it is possible to also switch off the switching elements 44 in addition to the switching elements 32 and thereby to achieve an improved safety, in particular in case of malfunctions of the switching elements 32. Namely, if contact sticking should for example occur in the area of the switching unit 30, the Y-capacitance can be considerably reduced by the switched-off Y-capacitors 22. Thereby, the remaining Y-capacitance, which in particular also includes parasitic Y-capacitances like those of the synchronous machine 12 or also of the electrical devices 18, can be kept low.

Thus, the described examples allow selecting capacitance values of the Y-capacitors 22 as large as possible to be able to realize the current-compensated inductor 34 as small and compact as possible. This saves installation space, cost and weight.

The examples as described may explain the present disclosure of an invention and are not intended to restrict an invention.

A description has been provided with particular reference to examples, but it will be understood that variations and modifications can be affected within the spirit and scope of the claims, which may include the phrase "at least one of A, B and C" as an alternative expression that refers to one or more of A, B or C, contrary to the holding in *Superguide v. DIRECTV*, 358 F3d 870, 69 USPQ2d 1865 (Fed. Cir. 2004).

The invention claimed is:

1. A method of operating an on-board power supply of an electrically drivable motor vehicle, comprising:
    supplying electrical energy to at least one electrical machine from a vehicle battery connected to the on-board power supply via an inverter connected to the on-board power supply in an intended drive operation, the inverter includes a radio interference suppression filter to reduce grid-bound interferences; and
    electrically disconnecting, by a first switching unit, at least the inverter from the on-board power supply in a charging operation of the electrically drivable motor vehicle.

2. The method according to claim 1, wherein the on-board power supply is supplied with high voltage.

3. The method according to claim 1, wherein at least one electrical device connected to the on-board power supply via the inverter, comprises a radio interference suppression filter with Y-capacitors, so that the electrically disconnecting includes deactivation of the Y-capacitors in the charging operation.

4. The method according to claim 3, further comprising disconnecting, by a second switching unit, the at least one electrical device from the on-board power supply.

5. The method according to claim 1, further comprising maintaining electrical connection of an electrical cooling device connected to the on-board power supply to cool the vehicle battery to the on-board power supply during the charging operation.

6. The method according to claim 3, further comprising:
    providing an electrical connection operation to electrically connect the at least one electrical device electrically disconnected from the on-board power supply to the on-board power supply, and temporally spacing the charging operation and the electrical connection operation from each other after terminating the charging operation.

7. The method according to claim 6, wherein the temporally spacing of the electrical connection operation is affected depending on an electrical power of a respective electrical device of the at least one electrical device.

8. An on-board power supply for an electrically drivable motor vehicle, comprising:
    at least a first electrical connection to connect to a vehicle battery of the electrically drivable motor vehicle;
    a second electrical connection to connect to an inverter that is electrically connected to at least one electrical machine to drive the electrically drivable motor vehicle in an intended drive operation, the inverter includes a radio interference suppression filter to reduce grid-bound interferences;
    a charging connection to electrically couple the on-board power supply to a charging station external to vehicle in a charging operation;
    a switching unit to electrically disconnect at least the second electrical connection from the on-board power supply depending on a switching state of the switching unit in the charging operation.

9. The on-board power supply according to claim 8, wherein the switching unit includes at least one electromechanical or electronic switching element.

10. A motor vehicle comprising:
    at least one electrical machine to drive the motor vehicle (50) in an intended drive operation;
    an on-board power supply to distribute electrical energy between electrical devices of the motor vehicle;
    an inverter connected to the on-board power supply and to the at least one electrical machine to electrically couple the at least one electrical machine to the on-board power supply, the inverter includes a radio interference suppression filter to reduce grid-bound interferences,
    a vehicle battery connected to the on-board power supply to provide electrical energy; and
    a charging connection connected to the on-board power supply to electrically couple the on-board power supply to a charging station external to vehicle in a charging operation,
    wherein the on-board power supply includes,
        at least a first electrical connection to connect to the vehicle battery,
        a second electrical connection to connect to the inverter that is electrically connected to the at least one electrical machine to drive the motor vehicle in an intended drive operation,
        a charging connection to electrically couple the on-board power supply to a charging station external to vehicle in a charging operation, and
        a switching unit to electrically disconnect at least the second electrical connection from the on-board power supply depending on a switching state of the switching unit in the charging operation.

* * * * *